May 14, 1963  R. W. ELLMS  3,089,205
MOLD AND CORE BLOWING MACHINE
Filed June 23, 1960  5 Sheets-Sheet 1

INVENTOR.
ROBERT W. ELLMS
BY
Oberlin, Maky & Donnelly
ATTORNEYS

May 14, 1963 R. W. ELLMS 3,089,205
MOLD AND CORE BLOWING MACHINE
Filed June 23, 1960 5 Sheets-Sheet 2

INVENTOR.
ROBERT W. ELLMS
BY
Oberlin, Maky & Donnelly
ATTORNEYS

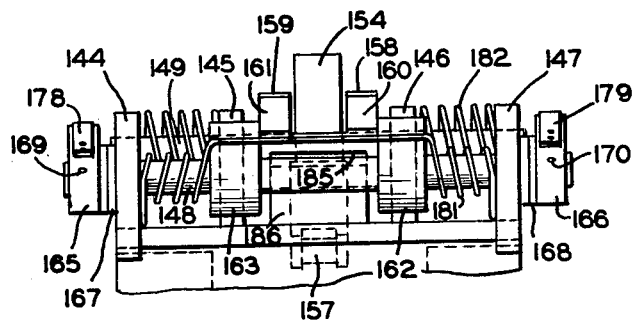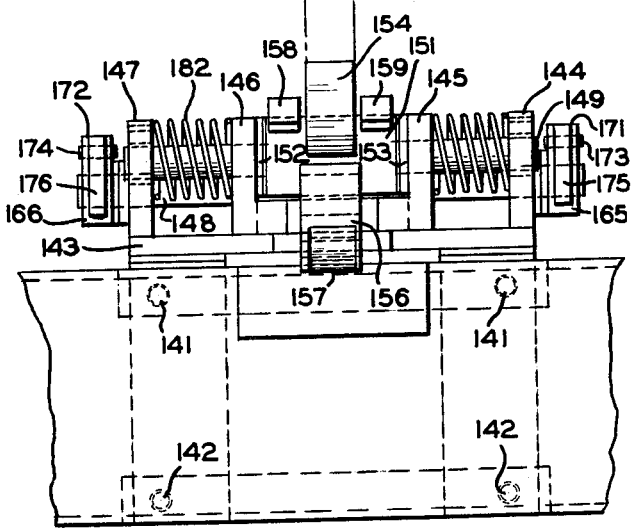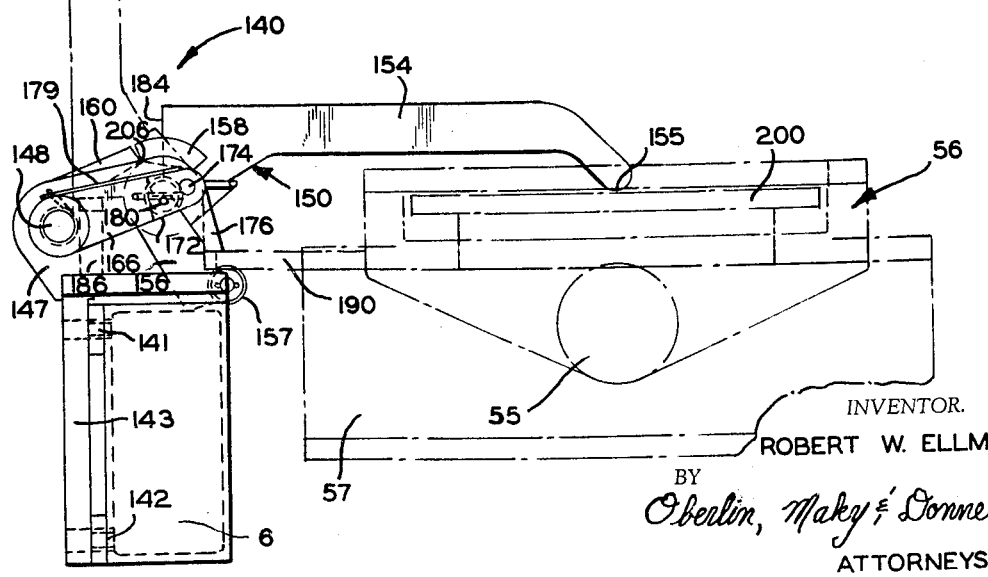

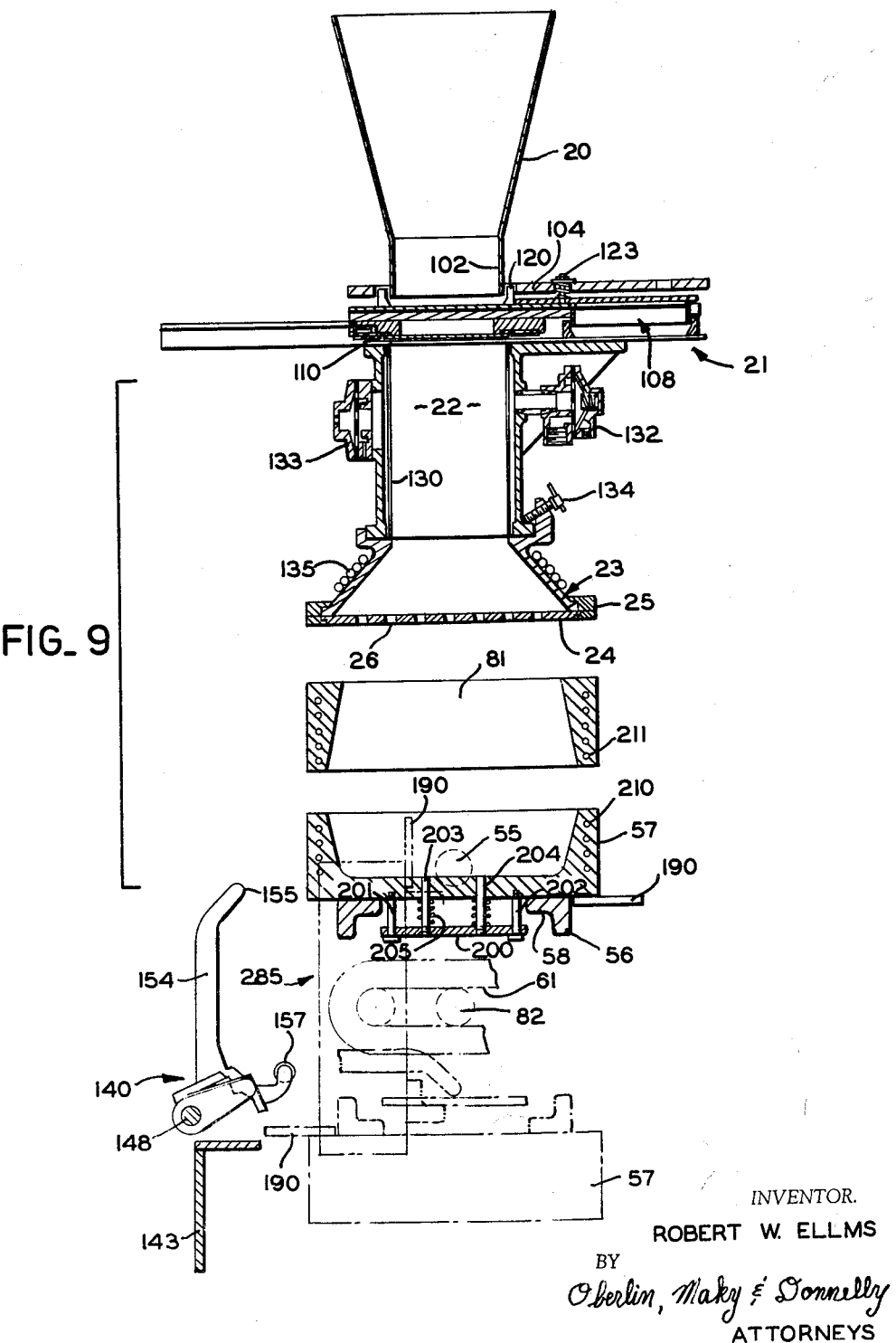

May 14, 1963  R. W. ELLMS  3,089,205
MOLD AND CORE BLOWING MACHINE
Filed June 23, 1960  5 Sheets-Sheet 5
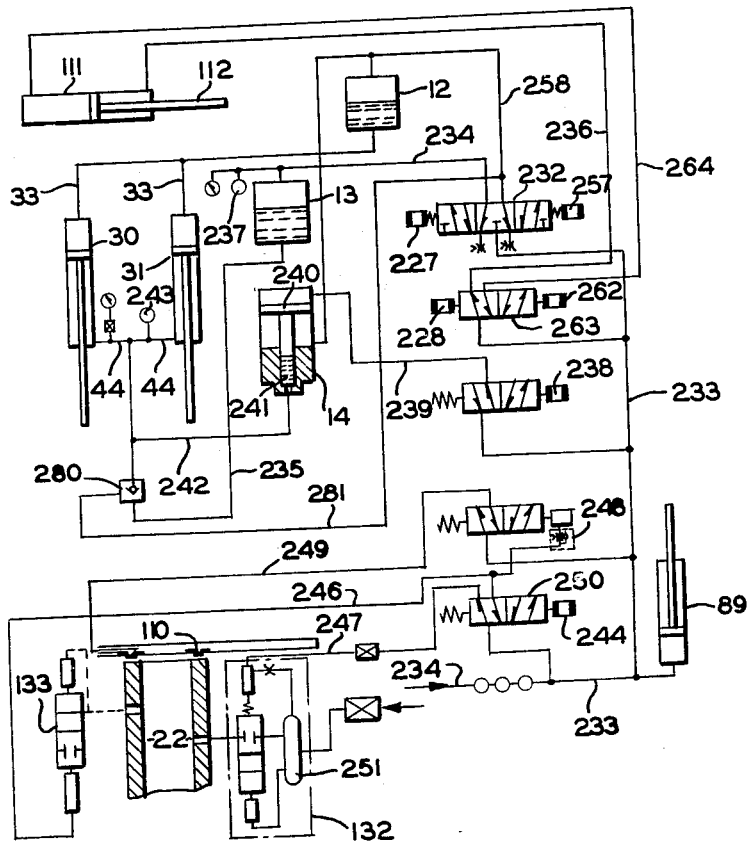
FIG_10
FIG_11
INVENTOR.
ROBERT W. ELLMS
BY
Oberlin, Maky & Donnelly
ATTORNEYS United States Patent Office 3,089,205
Patented May 14, 1963

3,089,205
MOLD AND CORE BLOWING MACHINE
Robert W. Ellms, North Olmsted, Ohio, assignor to The Osborn Manufacturing Company, Cleveland, Ohio, a corporation of Ohio
Filed June 23, 1960, Ser. No. 38,307
22 Claims. (Cl. 22—10)

This invention relates as indicated to a mold and core blowing machine, and more particularly to a machine adapted to employ a molding mix or medium which may be heat hardened while still in the machine.

Molding materials and especially core making materials are now available which may be very quickly hardened in situ within the molding or core blowing machine and thereafter employed without the usual subsequent baking operation. The so-called "C process" is one such molding process, but I prefer to employ the so-called "acid process" in practicing the present invention. The molding sand has mixed with it two substances which when heated will set up hard in only a few seconds' time. The material is relatively inexpensive so that full core bodies are commercially feasible and the material will also run out readily from the casting so that hollow body cores are not required. Molding materials of the general type indicated obviously permit performance of the hardening operation within the molding machine itself without seriously lengthening the cycling of the machine, and it is accordingly an important object of my invention to provide a mold and core blowing machine adapted to utilize such rapidly setting materials.

The use of such materials, however, involves certain problems including the danger of premature setting or partial hardening of the mix, and it is therefore another important object of this invention to provide such machine and mode of operation thereof which will substantially eliminate this danger.

Still another object is to provide such machine which will be capable of fully automatic operation through a predetermined cycle to obtain best results.

Another object is to provide a machine of relatively simple construction in which essential parts are conveniently accessible for maintenance and replacement including the interior of the reservoir to permit clearing the same in the event of premature hardening of the mix therein.

Yet another object is to provide such machine in which the operating cycle may be accomplished with but a single return stroke of a piston-cylinder assembly or assemblies.

A further object is to provide such machine wherein the mold or core may optionally be presented for convenient manual removal or alternatively inverted for automatic deposition upon a suitable conveyor or the like.

Other objects and advantages of the present invention will become apparent as the following description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 6 is a fragmentary detail view illustrating the core stripping mechanism employed with such machine;

FIG. 7 is a fragmentary view of such stripping mechanism as seen from the right in FIG. 6 with parts omitted for clarity of illustration;

FIG. 8 is a fragmentary view of such mechanism as seen from the left in FIG. 6;

FIG. 9 is a fragmentary somewhat schematic view of such machine illustrating the relative positions of certain of the components thereof;

FIG. 10 is a schematic diagram of the pneumatic and hydraulic controls for such machine; and FIG. 11 is a schematic wiring diagram of the electrical controls for such machine.

Figure 2:
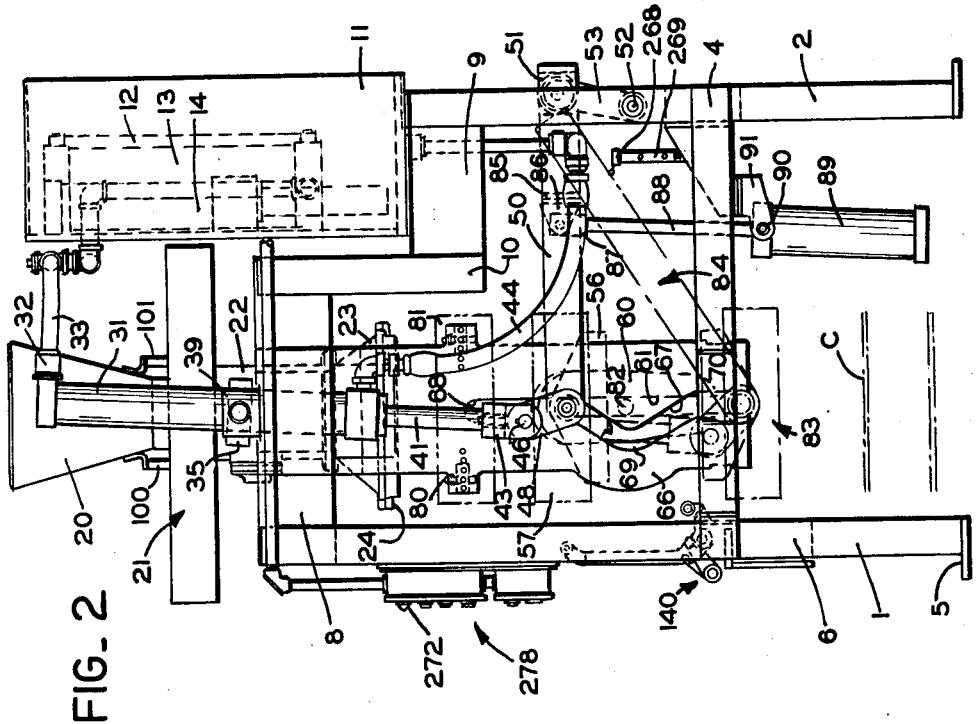
FIG. 2 is a side elevation of the machine of FIG. 1.
Figure 1:
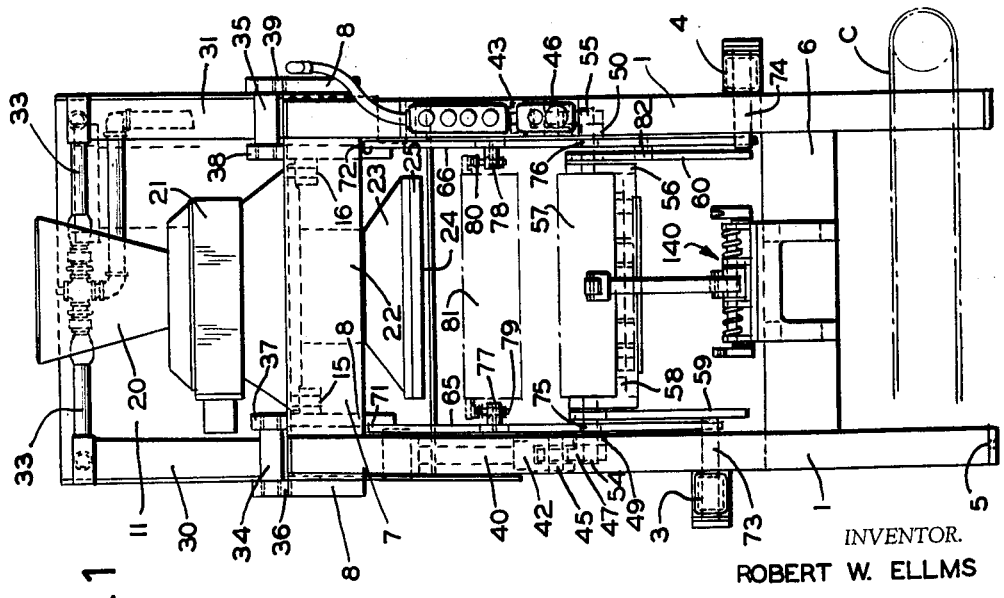
FIG. 1 is a front elevation of a mold blowing machine incorporating the principles of my invention.
Figure 3:
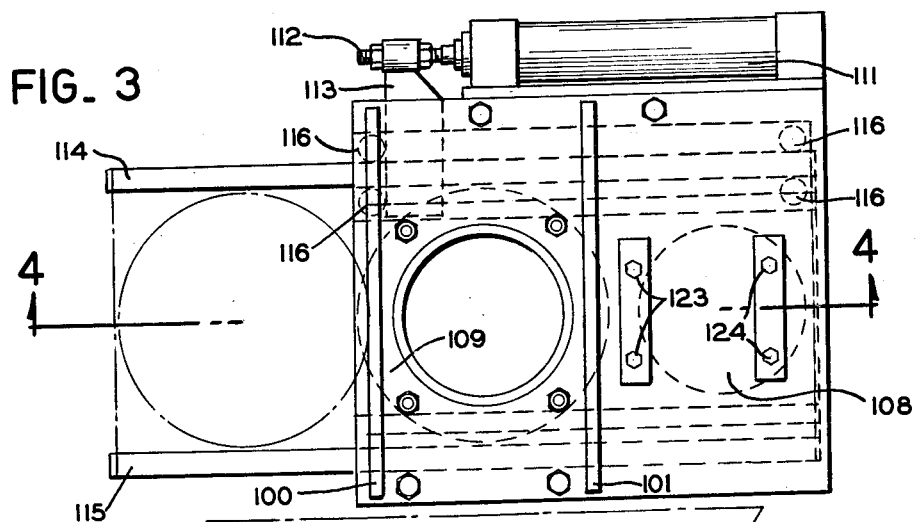
FIG. 3 is a top plan view of such machine with the loading hopper removed.

As seen more clearly in FIGS. 1 and 2, the illustrated embodiment of my machine may include upright tubular structural frame members 1 at the front of the machine and similar upright tubular members 2 supporting the rear of the machine as well as transverse tubular frame members 3 and 4 which may be welded or otherwise suitably secured to the upright members. As shown more clearly in FIG. 1, these structural frame members are of substantially rectangular sectional configuration and provide a firm and rigid frame for my illustrated machine. If desired, suitable bed plates or feet may be provided on the upright frame members as shown at 5 thereby firmly to support and secure such machine to the floor.

In addition to the transverse frame members 3 and 4, there are provided transverse support plates 6, 7 and 8 which serve further to rigidify the frame as well as support certain components of such machine. The upright supports 2 at the rear of the machine are considerably shorter than the upright supports 1 at the front of the machine and support transverse members 9 and offset upright shortened vertical supports 10. This offset portion at the rear of the machine provides a support for a housing 11 to house air-over-hydraulic actuating cylinders 12, 13 and 14 for a purpose hereinafter more clearly described.

Mounted on the top of the machine frame as by bolts 15 and 16 (FIG. 1) passing through supporting ears on the transverse members 8 is a sand blowing mechanism which includes a hopper 20 and a slide plate mechanism 21 mounted on the top of a sand reservoir 22. Secured to the bottom of the reservoir is a flaring head 23 thereof having a substantially rectangular blow plate 24 secured thereto as by ring 25, such blow plate having a series of apertures 26 therein through which the sand is blown. The details of this blowing mechanism are illustrated more clearly in FIGS. 3, 4, 5 and 9. Thus the blowing mechanism may be charged with sand through the hopper 20, such sand being blown through the plate 24 under high pressure as will hereinafter more fully be described.

In order to assemble and securely clamp a mold box or the like firmly in place beneath the blow plate 24 to receive the sand therein, I provide a pair of hydraulically actuated piston-cylinder assemblies 30 and 31. The blind ends of the cylinders of such piston-cylinder assemblies are connected as shown at 32 through conduits 33 to air-over-hydraulic cylinder 12 within the housing 11. Both of the cylinders are provided intermediately with respective collars 34 and 35. The collar 34 is mounted pivotally in upstanding ears 36 and 37 secured firmly to the machine frame and the collar 35 is pivotally mounted in upstanding ears 38 and 39. The projecting ears are firmly secured to the side frame members 8 so that the cylinder assemblies are aligned with and intermediate the respective front and rear vertical framing members 1 and 10. The rods 40 and 41 of the piston-cylinder assemblies are provided with clevises 42 and 43 respectively pivotally securing such rods to a cradle assembly for the mold or core box as hereinafter described. The rod ends of the cylinder assemblies 30 and 31 are connected to the air-over-hydraulic cylinder 13 through heavy duty flexible conduits 44. It can now be seen that the housing 11 positioned at the same height and fairly close to the piston-cylinder assemblies 30 and 31 provides a convenient location for the cylinders 12, 13 and 14 as well as the location for my control system components hereinafter more clearly described.

Each of the piston-cylinder assemblies 30 and 31 is pivotally connected to the cradle assembly of my machine as shown at 45 and 46 respectively. The clevises 42 and 43 are pivotally connected to links 47 and 48 which are rigidly fixed to links 49 and 50 extending rearwardly to a squaring shaft 51 through which such links 49 and 50 are rigidly secured to rotate therewith. The squaring shaft 51 is pivotally mounted to the machine frame as shown at 52 by a pair of links 53. Thus as shown in FIG. 2, the link 48 is secured to the link 50 which is in turn secured to the squaring shaft 51 in a manner to maintain the rigid angular relationship shown. Since there are two of these link assemblies on each side of the machine frame which are rigidly attached to the squaring shaft 51, it will be seen that the two piston-cylinder assemblies 30 and 31 are mechanically interconnected such that they will be forced to operate in unison.

At the junction of the links 49 and 50 and the offset links 47 and 48, I provide a bearing for oppositely extending horizontal pivot pins 54 and 55, such pins extending horizontally aligned and rigidly from the cradle mechanism 56. This cradle mechanism constitutes a support for a drag 57 in the illustrated machine, such cradle having inturned bottom flanges 58 thereby firmly to support such drag in the proper position. Rigidly fastened to each side of the cradle mechanism are depending slide plates 59 and 60, each of these slide plates being provided with a central linear slot 61 as shown more clearly in FIG. 2. Thus it will be understood that the pins 54 and 55 as well as the cradle 56 and the depending slide plates 59 and 60 are firmly secured together to rotate as a unit about the horizontal axis provided by the oppositely extending aligned pivot pins 54 and 55. Of course, the drag 57 secured to the cradle 56 will also rotate therewith.

Secured directly to the machine frame on each side thereof, I provide plates 65 and 66, each containing a cam slot 67 therein. The configuration of this cam slot is shown more clearly in FIG. 2 and such slot comprises an upper vertical portion 68, a rebent portion 69, and a lower vertical portion 70. These side cam slot plates are secured firmly to the machine frame, the upper ends being secured to the transverse members 8 as shown at the shoulders 71 and 72 (FIG. 1). The lower ends of the cam slot plates are fastened directly to the transverse tubular framing members 3 and 4 as shown at 73 and 74. The horizontally extending pins 54 and 55 of the cradle mechanism pass directly through the slots in the respective side plates 65 and 66 and are provided with anti-friction bearings as shown at 75 and 76.

As shown at 77 and 78, each of the cam slot plates 65 and 66 is provided with an inturned support member having aligning and supporting pins 79 and 80 therein to provide a support for a cope 81. The supporting and aligning pins 79 and 80 are positioned such to align the cope 81 with the drag 57 supported by the cradle 56.

It can now be seen that the reciprocation of the piston-cylinder assemblies 30 and 31 will cause movement of the horizontally extending pivots 54 and 55 through the extent of the cam slots 67. Since such pins are pivotally mounted in the links 47, 49 and 48, 50, as well as the cam slots 67, such cradle must be restrained from pivotal movement about such horizontal axis when the cradle is drawn upwardly to align the drag 57 with the cope 81 to assemble the core or mold box to be clamped against the blow plate 24. To accomplish this, I provide a pivot 82 mounted on the cam slot plate 66 directly in line with the upper vertical extension 68 of such cam slot and the lower vertical extension 70. This pivot has a roller or the like mounted within the slot 61 of the depending slide plate 60 which is firmly attached to the cradle. Thus when the pivot 55 is drawn upwardly through the vertical extensions 68 of the cam slot, the pivot 82 will maintain the cradle in its proper vertical upwardly facing position.

This pivot, however, also serves a secondary purpose in that it will cause the cradle to invert or rock over as the pivots 54 and 55 ride through the rebent portions 69 of the cam slots 67. Thus, as the horizontal pivot of the cradle moves downwardly and forwardly through the rebent portions 69 of the cam slots 67, the slide plate 60 will be constrained by pivot 82 and the cradle and drag supported thereby will then pivot through an angle 180° to be placed in the inverted position shown at 83 in FIG. 2. As the horizontal pivot 55 moves through the rebent portion 69 of the cam slot, the cradle and drag supported thereby will in effect pivot or rotate about the pivot 82 to be placed in the inverted position shown.

When the piston-cylinder assemblies 30 and 31 extend to place the drag in the inverted position shown, the squaring shaft 51 will rock forward about the pivots 52 to place the link mechanisms thereof substantially in the position shown in dotted lines in FIG. 2 at 84. Secured between the links 49 and 50 of the squaring shaft mechanism, I provide a plate or structural member 85 having ear 86 secured thereto which pivotally mounts the clevis 87 of rod 88 of piston-cylinder assembly 89. This assembly is pivotally mounted as shown at 90 to support 91 secured to the machine frame. This piston-cylinder assembly 89 acts as a counterbalance mechanism for the heavy squaring shaft mechanism and cradle mechanism to assure an evenness of movement of the cradle through the rebent portions of the cam slots thereby to insure an even drawing of the mold or core from the corebox. An equivalent of such mechanism would be, for example, an extension of the squaring shaft links 49 and 50 and the placing of a counterbalance weight on the ends thereof.

*The Blow Mechanism*

Referring now to the sand-mix blowing mechanism shown in detail more clearly in FIGS. 3, 4, 5 and 9, such mechanism includes the basic elements of the hopper 20, the slide mechanism 21, the reservoir 22 and the head 23 terminating in downwardly facing blow plate 24. As shown in FIG. 1, the reservoir 22 is mounted directly on the machine frame and the hopper 20 is mounted on upstanding supports 100 and 101 positioned on the top of the slide mechanism 21. Such hopper 20 has a depending annular spout 102 projecting within an annular top opening 103 in the top slide housing frame member 104. This upper blow slide frame member 104 has an appearance housing or shield 105 mounted thereon. Such housing acts to protect the various components of the machine from loose sand being distributed by such slide mechanism as well as to improve the appearance of the machine. The slide mechanism 106 has a hardened steel, as for example, a chrome-steel plate 107 mounted on the top thereof which includes an annular orifice 108 therein of a diameter approximately the same as the diameter of the extension 102 of the hopper 20. Such slide also includes an annular downwardly projecting portion 109 having an air actuated annular sealing ring 110 therein which when inflated will effect a peripheral seal around the top of the reservoir 22. The slide is actuated by piston-cylinder assembly 111, the rod 112 of which is adjustably connected to the slide as shown at 113. Such slide rides on parallel rails 114 and 115 with four depending rollers 116 contacting each side of the rail 114 thus to provide a guide and retaining means for the reciprocation of the slide from its position closing the opening from the hopper to the reservoir and back to its position opening such reservoir.

Figure 4:
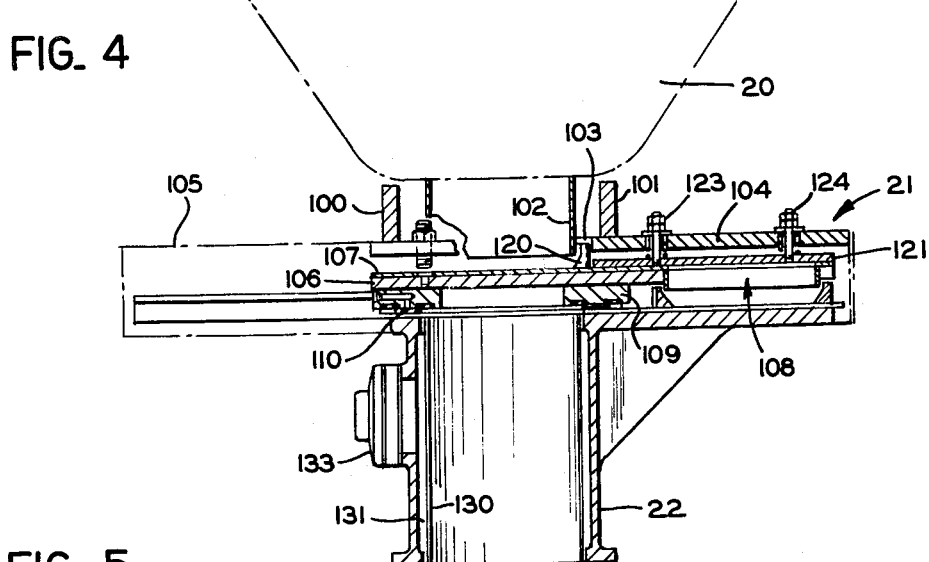
FIG. 4 is a vertical elevation taken on the line 4—4 of FIG. 3 through the reservoir and gate operating mechanism.
Figure 5:
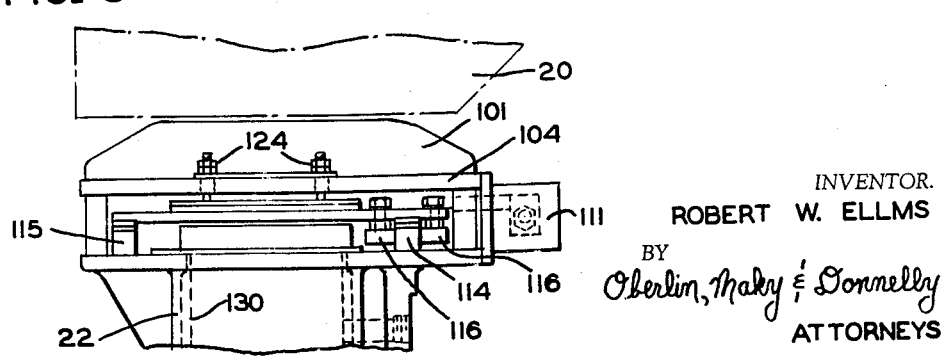
FIG. 5 is a fragmentary rear view of such reservoir and mechanism.

In the FIG. 4 position, the slide is shown closing the opening between the hopper 20 and the reservoir 22 and with the inflatable ring 110, such will form a very accurate and complete air seal for the reservoir 22. Upon actuation of the piston-cylinder assembly 111, the slide will be moved to the left to align the aperture 108 with the extension 102 of the hopper 20 whereby the sand within such hopper will drop down into the reservoir substantially filling the same. After the reservoir is full, the piston-cylinder assembly 111 is retracted to move the slide back to its FIG. 4 position. During this operation, sand that has fallen through the extension 102 will be scraped or removed from the top plate 107 of the slide by the element 120. The aperture 108 will then contain a wafer of sand which will be held in place within the aperture of the slide by the resiliently mounted plate 121 secured to the frame member 104 by the nut and bolt assemblies 123 and 124. After the sand has been blown from the reservoir and the slide is moved back again to fill such reservoir, the wafer of sand within the opening or aperture 108 will then be dropped into the reservoir 22.

The reservoir 22 includes a perforated lining 130 and an annular recessed portion 131 between the lining and the wall of the reservoir. Mounted on the wall of the reservoir are diaphragm type blow valve 132 and exhaust valve 133 which are effective to supply air under high pressure to the reservoir and to exhaust such high pressure air therefrom. As seen in FIG. 9, the bottom of the reservoir is provided with head 23 which may be removed by adjustment of screw mechanism 134, such head including a plurality of cooling tubes 135 surrounding the flaring portion of such head. The blow plate 24 with apertures 26 therein is then secured to the head 23 through which the sand within the reservoir is forced by such high pressure air entering through blow valve 132.

As an example of the blow mechanism that may be employed with my invention, reference may be had to the copending application of Leon F. Miller, Serial No. 805,174, filed April 9, 1959, entitled "Blow-Squeeze Molding Machine," this application also being assigned to The Osborn Manufacturing Company of Cleveland, Ohio.

It will now be understood that a particulate molding material which may be supplied to the hopper 20 by means of a conveyor or the like will be supplied to the reservoir 22 which will then be sealed and subjected to an extremely high air pressure to force the sand outwardly through the apertures 26 in the blow plate into the assembled mold box, clamped therebeneath by the pair of piston-cylinder assemblies 30 and 31.

Core Stripping Mechanism

Referring now to FIGS. 6, 7, 8 and 9, I have illustrated a unique core stripping mechanism whereby the mold may be automatically removed from the drag as the drag is inverted by the machine. As shown in FIG. 1, such mechanism 140 may be mounted directly on the transverse frame member 6 being bolted directly thereto as shown at 141 and 142, and includes a mounting bracket 143 having four upstanding supporting ears 144, 145, 146 and 147, having the profile configuration more clearly seen in FIG. 6. These ears each have a pair of apertures therein to accommodate shafts 148 and 149. Mounted centrally on the shaft 149 between the upstanding supports 145 and 146 is a bell-crank shape arm member 150, the hub 151 of this arm being provided with thrust bearings on each side thereof as shown at 152 and 153 to center such arm between the supports 145 and 146. The arm mechanism 150 includes an elongated top arm 154 having a contact 155, which may be a roller or the like, as well as a lower offset portion 156 provided with contact roller 157. Thus the arms 154 and 156 projecting from the hub 151 will rotate as a unit about the shaft 149 as shown by the dotted line position in FIG. 6.

Mounted on the hub 151 on each side of the arm 154 are two circular segment cams 158 and 159 which are aligned with stop arms or followers 160 and 161 which are rigidly secured to the collar members 162 and 163 which are keyed or pinned to the shaft 148. Thus each of the stops or followers 160 and 161 will abut against the respective cams 158 and 159 secured to the hub 151 of the arm mechanism.

Secured to each end of the shaft 148 are cam arms 165 and 166 which may also be provided with thrust bearings 167 and 168 to hold the same in proper relation to the respective upright supports 144 and 147. These cam arms may be fastened to the shaft as by cotter pins or the like through openings 169 and 170 (FIG. 8). Each of the cam arms 165 and 166 is provided with a bifurcated end as shown at 171 and 172 wherein there is pivoted as at 173 and 174 cam latch members 175 and 176 of the profile configuration more clearly shown in FIG. 6. Each of the cam members 175 and 176 is provided with an offset rear portion which engages on the top, leaf springs 178 and 179, respectively, overlying such bifurcated portions of the cam arms and on the bottom, a stop pin 180. Thus, in the position shown in FIG. 6, the member 176 may pivot about 174 against the pressure of the spring 179 but cannot pivot in a counterclockwise direction due to the stop pin 180 passing through the bifurcated portion 172 of the cam arm 166.

Each of the shafts 148 and 149 is provided with respective coil springs 181 and 182, such springs tending to rotate the shaft 149 in a counterclockwise direction and the shaft 148 in a clockwise direction as seen in FIG. 6.

In the inoperative position of the arm mechanism 150, the spring 182 will tend to rotate the arm to the dotted line position shown at 183 in FIG. 6 with the angled or back shoulder portion 184 of the arm 154 abutting against impact block 185 mounted on support 186 on the top of the mounting bracket 143. Thus the spring 149 will hold the arm in the upright position shown in FIG. 6 when the arm is not in operation to strip a core in a manner hereinafter described.

My cradle 56 is provided with three lateral extensions 190 which are spaced apart so that one each will contact, respectively, the cam member 175, the roller 157 and the cam member 176.

As shown more clearly in FIG. 9, the drag 57 will be inverted and lowered through the bottom extension 70 of the cam slot such that the middle extension 190 on the cradle will contact the roller 157 pivoting the arm 150 against the pressure of spring 182 about the shaft 149. At this time, the stops or followers 160 and 161 will be riding on the top of the cam segments 158 and 159 in the position shown perhaps more clearly in FIG. 9. As the arm 154 continues to rotate in a clockwise direction as the result of the downward pressure on the roller 157 by the middle extension 190, the followers 160 and 161 will ride over the top of the arcuate cam segments 158 and 159 until they snap behind the same to the position shown in FIG. 6 as the result of the continuing clockwise pressure of spring 181.

At this time, the arm 154 will have contacted plate 200 mounted on the bottom of the drag for movement toward and away therefrom by studs 201 and 202 threaded into the drag 57. Secured to the plate 200 are push-out pins 203 and 204 which will extend within the mold and are surrounded by compression springs 205. When the drag has reached this position and the arm is contacting such plate 200, the following will have occurred, viz., the followers 160 and 161 will have snapped behind the cams 158 and 159 locking arm 154 against counterclockwise movement; the cams 175 and 176 will have ridden over the top edges of outer extensions 190, such extensions pivoting the cams 175 and 176 out of the way during downward movement of the drag against the pressure of springs 178 and 179 which then snaps the cams 175 and 176 back into the latching position shown in FIG. 6; and the roller 157 beneath the center extension 190 will keep the arm 154 against plate 200. At this time, a limit switch hereinafter described may immediately reverse the movement of the drag to start the same upwardly. With the cams 175 and 176 latched on top of the outer extensions 190, upward movement of the cradle and drag will pivot the cam arms 165 and 166 and thus shaft 148. This will tend to rotate the stops 160 and 161 in a counterclockwise direction but this will also initially preclude the movement of the arm 154 since the followers 160 and 161 will be engaging the back face of the arcuate cam segments 158 and 159 as shown at 206. As soon as the shaft 148 has pivoted sufficiently to allow the abutment arms 160 and 161 to ride over the cams 158 and 159, the arm 154 may then follow the upward movement of the drag thus to pivot to the dotted line position 183 when the extension 190 has cleared the roller 157. When the stop abutments 160 and 161 ride over the tops of the cams 158 and 159, this will move the cams 175 and 176 out of the way of the outer extensions 190 as shown in FIG. 9 thus to permit the drag to move in an upward direction. It can now be seen that during the initial upward movement of the drag, the arm 154 will hold the plate 200 against such upward movement causing a depression of the pins 203 and 204 to strip or extract the mold or core from the drag 57. In effect, the core or mold is held firmly in position and the drag is pulled away therefrom. It will, of course, be understood that downward movement of the drag beyond the position shown in FIG. 6 could be employed to punch or push out the mold but I prefer to hold the mold and pull the drag away therefrom since there will be less likelihood of damage to the mold.

As shown in FIG. 9, the illustrated machine employs a drag 57 and a cope 81 having, respectively, electrical resistance elements 210 and 211 embedded therein whereby both the cope and drag may be continuously heated during the operation of my machine. It will be understood that whereas I have illustrated a two part mold or corebox, i.e., a corebox comprising a cope and drag, that a single, triple or other multi-part mold box may be employed depending upon the configuration of the pattern therewithin. Thus, the generic term "corebox" may refer to the cope or drag as well as the assembled box formed by such cope and drag.

Sand-Mix

Referring now to the sand-mix which may preferably be employed with my invention, any particulate molding material such as sand employing a heat settable binder may be employed therewith. A common type of sand mix that may be employed is the mix commonly employed in a "C process." In such process, a plastic binder of from six to eight percent of the mix may be added to silica sand thus forming ninety-two to ninety-four percent of the mix. The plastic binder may generally be composed of a phenol resin and hexamethylenetetramine in the proportion of phenolic resin—90%, hexamethylene-tetramine—10%. In the use of such material, generally hollow molds are produced. Such "C-process" resins are quite generally commercially available as, for example, from the Durex Plastics and Chemicals, Inc. of North Tonawanda, New York.

I, however, prefer to use the "acid process" wherein an acid such as muriatic or oxalic acid is used as a catalyst with certain additional accelerators as well as the common phenolic resin. Such sand mix is now commercially available from the Archer-Daniels-Midland Company of Cleveland, Ohio, under the trade name of ADM–200. With this mix, solid, highly porous cores are produced with considerably less heat and considerably shorter curing periods. Here again, the binder employed is a typical phenolic binder with such acid merely acting as a catalyst to speed the setting thereof.

It will, of course, be understood that other mixes may be employed and that the term sand is employed herein generically to include green molding sand as, for example, sand with an oil or rosin binder or for that matter merely a fluid or water binder as well as the sand mixes employed in the "C" and "acid" process.

Operation and Controls

Referring now to FIGS. 10 and 11, the operation of my device will be seen as follows.

Referring first to FIG. 11, electrical current as, for example, 440 volt, single phase, 60 cycle, may be supplied through lines 220 and 221 with a conventional disconnect switch 222 being employed therein. A transformer 223 may be employed to reduce the line voltage between my mains 224 and 225 to 110 volts.

The start cycle button 226 may be pressed to energize solenoids 227, 228 and relay 229 through line 230. Relay 229 closes holding switch 231 to keep the line 230 energized.

The energization of solenoid 227 moves valve member 232 (FIG. 10) to the right to provide a connection between air suply conduit 233 and conduit 234 leading to air-over-hydraulic cylinder 13. Conduit 233 is connected directly to a source of air pressure as at 234 whereby air will be provided under pressure directly to the cylinder 13 to force hydraulic fluid through line 235 to lines 44 to actuate the pair of piston-cylinder assemblies 30 and 31 to cause the cradle to move upwardly.

The energization of solenoid 228 connects the conduit 233 to the conduit 236 to cause the piston-cylinder assembly 111 to retract thus to position the slide in the blow position, sand having fallen through opening 108 to fill reservoir 22. Pressure switch 237 is set to trip at approximately 80 pounds per square inch energizing solenoid 238 to connect the conduit 233 with conduit 239 to provide air under pressure behind the piston 240 of cylinder 14. The air within the cylinder 14 then forces the piston 240 down against oil positioned within small chamber 241 in such cylinder applying a booster pressure through conduit 242 at approximately 2000 pounds per square inch. When the 2000 pounds per square inch pressure is applied to the rod end of the pair of cylinder assemblies 30 and 31, the cradle will have lifted the drag to reinvert the same from the inverted position shown at 83 to the upright position with continued upper movement assembling the drag 57 with the cope 81 on the aligning and supporting pins 79 and 80 and with further upward movement clamping the assembled mold box firmly beneath the blow plate 24 in position to receive the sand through the openings 26 when the blowing operation is commenced.

At such high pressure, i.e., 2000 pounds, pressure switch 243 will be tripped energizing solenoid 244 as well as a timer 245. The energization of solenoid 244 connects the conduit 233 to the conduit 246 simultaneously connecting the conduit 247 to exhaust. This connects flow control valve 248 to the source of air pressure 234 to connect directly conduit 233 with conduit 249 to inflate the seal ring 110. The air pressure within conduit 246 moves the exhaust valve 133 to a closed position thus to seal the reservoir 22. The venting of the conduit 247 through valve member 250 causes movement of the blow valve to permit air from reservoir 251 to pass into the diaphragm valve member thus to connect the air reservoir 251 directly to the sand reservoir 22 forcing sand through the blow plate into the mold box.

At the end of the blow period which may, for example, be from 1 to 2 seconds, the timer 245 times out to deenergize solenoid 244 through switch 252. This deenergizes the solenoid 244 after the blow period to deflate the seal ring 110, open exhaust valve 133, and close the blow valve 132. Switch 253, also actuated by the timer 245, energizes relay 254 to open switch 255 and close switch 256.

The opening of switch 255 deenergizes solenoids 227 and 228 with the deenergization of solenoid 227 moving the valve member 232 back to its center position wherein conduit 234 is connected to exhaust. The closing of switch 256 energizes cradle-down solenoid 257 to move the valve 232 to connect conduit 233 to conduit 258 wherein air under pressure will be supplied to air-over-hydraulic cylinder 12 to supply oil to the blind end of piston-cylinder assemblies 30 and 31 through conduits 33.

Continued downward movement of the cradle carrying both the cope and drag or corebox will trip a limit switch 259 which will open contacts 260 deenergizing solenoid 257 to stop the downward movement of the cradle. The closing of contacts 261 of the limit switch 259 energizes solenoid 262 moving valve member 263 to connect conduit 233 with conduit 264 to move piston-cylinder assembly 111 to position the slide for fill. The closing of contacts 261 also energizes timer 265 which is set to govern the period of time in which the corebox will remain in the "cure" position, this timer closing a holding switch 266. When the timer 265 times out, it closes switch 267 bypassing the now open contacts 260 again to energize the cradle-down solenoid 270. Continued downward movement of the cradle will cause the cope 81 to contact the supporting pins 79 and 80 thus to separate the drag 57 therefrom drawing the core or mold from the cope. Continued downward movement of the cradle will move the drag to a position wherein the drawn core is clear of the top mold section or cope and will then commence to rotate or invert the drag through the reentrant cam slot portion 69. When the drag is completely inverted, continued downward movement through the slot portion 70 will be halted by the energization of limit switch 268. The opening of switch 268 immediately deenergizes the solenoid 257 and reenergizes the solenoid 227. The deenergization of time delay device 254 returns the switch 255 to its normally closed position thus reenergizing the cradle-up solenoid 227.

The limit switch 268 is mounted in a position shown more clearly in FIG. 2 upon adjustable stand 269 such that the arm of the limit switch will contact link 50 in the dotted line inclined position shown. Accordingly, the mere adjustment of the position of the limit switch can exactly control the position at which the cradle will reverse its direction of movement.

Normally closed switch 270 is controlled by time delay device 265 and will not be returned to its closed position until such device is deenergized through the opening of limit switch 271 which is tripped by the cradle upon its upward path of movement, such limit switch deenergizing the cradle-up solenoid 227 and, of course, resetting the various components such that the energization of cycle switch 226 will recommence the hereinbefore described cycle operation. A cycle-on light 272 may be employed to signal the operator that the cycle is in progress. Also, various manually operated push buttons 273, 274, 275 and 276 may be employed to control the function of the components adjustably to place or set the cradle in the proper position such that it may be moved automatically through a complete cycle by the simple energization of the start switch 226. Further, manually operated emergency stop switch 277 may also be employed as a safety feature, such manual switches being located on the front of the machine as shown more clearly at 278 in FIG. 2.

The component parts of my pneumatic and hydraulic control system are generally conventional. It is noted, however, that a pilot operated check valve 280 is connected in line 235 supplied with air through line 281 connected to conduit 258 connected to the valve member 232. Thus when the line 281 is not under pressure, the valve member 280 acts merely as a check valve to preclude fluid in line 242 from passing outwardly through line 235. However, when the valve is operated, the check valve no longer operates as such but readily permits fluid to pass through line 235 to exhaust the hydraulic fluid in piston-cylinder assemblies 30 and 31.

In addition to the limit switches 271, 268 and 259, I may also provide a limit switch 282 operated by the blow slide when moved to its blow position. Since this switch is in series with the blow valve solenoid 244, it can readily be seen that this provides a safety interlock to preclude the blowing operation from being inadvertently commenced prior to the proper positioning of the blow slide.

While I have illustrated a machine that inverts the drag 57 completely to deposit the core or blown mold on a conveyor C or the like for automatic removal from the machine, such mold being stripped from the drag 57 by the stripping mechanism 140, it will readily be understood that by a simple adjustment of the position of the limit switch 268, that the cradle may be halted in the intermediate or 90° rotative position shown in phantom lines at 285 in FIG. 9. In this position, the drag will be facing forwardly in a vertical or upended position which will enable the operator manually to lift the blown core or mold from the drag. In such an operation, the core or mold stripping mechanism 140 may be removed from the machine frame simply by removing the mounting bracket 143.

It can now be seen that the provision of the heating elements 210 and 211 in the components of the mold box will maintain the box at a temperature rapidly to induce the setting or hardening of the sand-mix blown therein. The heat may be thermostatically controlled and varied depending upon the particular sand mix employed with the machine. The heat provided is sufficient merely to solidify the sand mix to a hardness to enable the core or mold readily to be withdrawn from the mold box without damaging the same. With the new resin mixes available including those in both the "C" and "acid" processes, the hardening of the mold often continues after the mold or core has been hardened sufficiently to withdraw the same from the mold box. However, in the newer mixes, it is possible to produce a core that is hardened or solid all the way through and yet is of the proper porosity.

I have found that excellent results have been obtained in using the "C process" mix to produce hollow cores when the cope and drag are heated continuously to a temperature of from about 500–600 degrees F. and the corebox held in cure position for from about 30–40 seconds. When using the "acid process," the temperature may be reduced to from about 200–300 degrees F. and the box held in such cure position for from about 10–20 seconds.

With my machine, a single pair of piston-cylinder assemblies is employed to assemble the drag with a cope to form a corebox and then to clamp the corebox firmly in position to receive the sand discharged through the blow hole on but one stroke of such piston-cylinder assembly. On the return stroke, after the sand has been blown within the corebox, such piston-cylinder assemblies automatically disassemble the drag and cope drawing the core from the cope and then inverting the drag about a horizontal axis to facilitate the withdrawal or removal of the core from the drag. Thus all of the motions required to accomplish the various functions result from but one stroke of my piston-cylinder assemblies.

Other modes of applying the principle of the invention may be employed, change being made as regards the details described, provided the features stated in any of the following claims or the equivalent of such be employed, I, therefore, particularly point out and distinctly claim as my invention:

1. In a mold blowing machine having a sand reservoir with an opening for charging with sand, means for closing such opening, a blow valve operative to admit high pressure air to said reservoir, an exhaust valve operative to relieve the pressure in said reservoir, a blow hole through which sand is discharged from said reservoir by such high pressure air, and clamp means operative to clamp a mold box or the like firmly in position to receive sand discharged through such blow hole; said clamp means including a pair of pivotally mounted fluid pressure operated piston-cylinder assemblies, a cradle support assembly for said mold box pivotally mounted on the rod ends of said piston cylinder assemblies about a common horizontal pivot axis, each said cradle pivot being confined in a cam slot having vertically extending and rebent portions, slot means secured to said cradle and extending from such horizontal pivot axis generally parallel to said cam slots, a pivot on said machine adjacent said rebent portion of said cam slots and engaged in said slot means secured to said cradle, whereby vertical movement of said cradle by said piston-cylinder assemblies will cause said cradle to rotate about such horizontal pivot axis as such axis moves through the rebent portion of said cam slots thereby to facilitate the withdrawal of a mold from such mold box.

2. A mold blowing machine as set forth in claim 1 wherein said cradle support assembly includes a squaring shaft for said piston-cylinder assemblies, means pivotally mounting said squaring shaft on said machine to extend parallel to such horizontal pivot axis, and parallel link means proximally secured to said squaring shaft to rotate therewith and pivotally intermediately secured to said cradle at such horizontal pivot axis, said link means terminating distally in an offset portion to which the rod ends of said piston-cylinder assemblies are attached thereby to insure the uniform movement of each said piston-cylinder assembly.

3. A mold blowing machine as set forth in claim 2 including a pneumatic counterbalance piston-cylinder assembly, the rod of said counterbalance piston-cylinder assembly being secured to said link means thereby to support and counterbalance said cradle assembly.

4. A mold blowing machine as set forth in claim 2 including stop means adjustably positionable to contact said link means thereby to limit the stroke of said pair of piston-cylinder assemblies.

5. A mold blowing machine as set forth in claim 1 including heating means to heat the sand within the mold box prior to rotation thereof sufficiently to solidify such sand mold to withdraw the same from said mold box.

6. A mold blowing machine as set forth in claim 5 wherein said heating means comprises electrical resistance elements embedded within said mold box, and means to actuate said pair of piston-cylinder assemblies to move said mold box away from said sand reservoir after sand has been blown therein and to hold the same in a position to cure such sand therein where the heat from said resistance elements will not affect the sand in said reservoir.

7. A mold blowing machine as set forth in claim 6 including cooling means adjacent said sand reservoir thereby to maintain the flowability of such sand therein.

8. A mold blowing machine as set forth in claim 1 wherein said mold box is the drag half of a cope and drag mold box, and including means to actuate said pair of piston-cylinder assemblies to assemble said drag and cope to clamp the same in position to receive sand discharged through such blow hole.

9. A mold blowing machine as set forth in claim 8 wherein both said cope and drag have resistance heating elements therein.

10. A mold blowing machine as set forth in claim 9 including means to actuate said pair of piston-cylinder assemblies to move said assembled cope and drag away from said sand reservoir after sand has been blown therein and to hold the same in a position to cure such sand therein where the heat from such resistance elements will not affect the sand in said reservoir.

11. A mold blowing machine as set forth in claim 10 including means to actuate said pair of piston-cylinder assemblies after such sand within said cope and drag has been cured sufficiently to solidify the same to facilitate withdrawal, and to move said drag away from said cope to disassemble said mold box and draw such mold from the cope prior to rotation of the drag about such horizontal axis to facilitate withdrawal of such mold from the drag.

12. A mold blowing machine as set forth in claim 11 wherein said drag is rotated about such horizontal axis completely to invert the drag to facilitate withdrawal of such mold onto a conveyor or the like.

13. A mold blowing machine as set forth in claim 12 including means to strip such mold from the inverted drag as said pair of piston-cylinder assemblies reverse their direction of movement.

14. In a core blowing machine having a sand reservoir with an opening for charging with sand, means for closing such opening, blow means operative to admit high pressure air to said reservoir, exhaust means operative to relieve the pressure in said reservoir, a blow hole through which sand is discharged from said reservoir by such high pressure air, and clamp means operative to clamp a core box or the like including a separable cope and drag firmly in position to receive sand discharged through such blow hole; said machine including means to separate such cope and drag after such core box has been unclamped to draw the core from such cope, and guide means cooperating with said clamp means to invert such drag after the core has been thus drawn from such cope to facilitate the drawing of the core from such drag, said machine being a unitary apparatus and carrying out its entire function at one location.

15. A core blowing machine as set forth in claim 14 wherein such cope and drag are heated by electrical resistance elements therein; and means to hold such corebox away from said reservoir for a period of time sufficient to cure such core sufficiently to solidify to facilitate withdrawal of such core from the cope as the cope and drag are separated, and withdrawal from the drag as the drag is inverted.

16. In a core blowing machine having a sand reservoir with an opening for charging with sand, means for closing such opening, blow means operative to admit high pressure air to said reservoir, exhaust means operative to relieve the pressure in said reservoir, a blow hole through which sand is discharged from said reservoir by such high pressure air; guide means; piston-cylinder means cooperating with said guide means operable to assemble a drag with a cope to form a corebox and clamp such corebox firmly in position to receive sand discharge through such blow hole on one stroke thereof, and on the return stroke thereof, after sand has been blown within such corebox, operable to disassemble the drag and cope to draw the core from the cope and to revolve the drag about a horizontal axis to facilitate withdrawal of such core from the drag.

17. A core blowing machine as set forth in claim 16 wherein the cope and drag are heated, and means to stop said piston-cylinder means on the return stroke for a period sufficiently to rigidify such core to facilitate subsequent withdrawal from the cope and drag as the return stroke is resumed.

18. A core blowing machine as set forth in claim 17 wherein said piston-cylinder means is stopped when such corebox is sufficiently far from said reservoir to preclude the partial hardening of the sand within said reservoir.

19. In a core molding machine of the type wherein a cope and drag are assembled to form a corebox; guide means; piston-cylinder means cooperating with said guide means operable to assemble such drag and cope to form a corebox and clamp such corebox firmly in position to receive sand on one stroke thereof, and, on the return stroke thereof, after sand has been placed within such corebox, operable to disassemble such drag and cope to draw the core from the cope and to revolve the drag about a horizontal axis to facilitate withdrawal of the core from the drag.

20. In a mold blowing machine having a sand reservoir with an opening for charging with sand, means for closing such opening, blow means operative to admit high pressure fluid to said reservoir, a blow hole through which sand is discharged from said reservoir by such high pressure fluid, exhaust means operative to relieve the pressure in said reservoir, and clamp means including a support for a mold box or the like operative to clamp such box firmly in position to receive sand discharged through such blow hole; and guide means cooperating with said clamp means operable to invert said support and thus such mold box to facilitate the drawing of the mold from such mold box, said machine being a unitary apparatus and carrying out its entire function at one location.

21. In a mold blowing machine having a sand reservoir with an opening for charging with sand, means for closing such opening, blow means operative to admit high pressure fluid to said reservoir, a blow hole through which sand is discharged from said reservoir by such high pressure fluid, exhaust means operative to relieve the pressure in said reservoir; vertically movable clamp means operable on upward movement thereof to clamp a box firmly in position to receive sand through such blow hole, and means responsive to downward movement of said clamp means operative to invert such box to facilitate the drawing of the mold therefrom.

22. In a core blowing machine having a sand reservoir with an opening for charging with sand, means for closing such opening, blow means operative to admit high pressure air to said reservoir, exhaust means operative to relieve the pressure in said reservoir, a blow hole through which sand is discharged from said reservoir by such high pressure air, and clamp means operative to clamp a core box or the like including a separable cope and drag firmly in position to receive sand discharged through such blow hole; said machine including means to separate such cope and drag after such core box has been unclamped to draw the core from such cope, guide means cooperating with said clamp means to invert such drag after the core has been thus drawn from such cope to facilitate the drawing of the core from such drag, and a cradle assembly adapted to support such drag, horizontally extending pivots on said cradle assembly, said clamp means comprising a pair of piston-cylinder assemblies operatively connected to said cradle assembly to move said cradle assembly to assemble and disassemble such core box and draw such core therefrom.

References Cited in the file of this patent
UNITED STATES PATENTS

| | | |
|---|---|---|
| 1,965,352 | Newman | July 3, 1934 |
| 2,391,715 | Kloss | Dec. 25, 1945 |
| 2,457,196 | Baysinger et al. | Dec. 28, 1948 |
| 2,563,643 | Ranek | Aug. 7, 1951 |
| 2,640,234 | Bergami | June 2, 1953 |
| 2,716,789 | Davis | Sept. 6, 1955 |
| 2,783,509 | Miller | Mar. 5, 1957 |
| 2,825,107 | Schueler | Mar. 4, 1958 |
| 2,826,792 | Bey | Mar. 18, 1958 |